C. W. McKINLEY.
MOTOR VEHICLE CONSTRUCTION.
APPLICATION FILED DEC. 7, 1917.
1,346,326. Patented July 13, 1920.
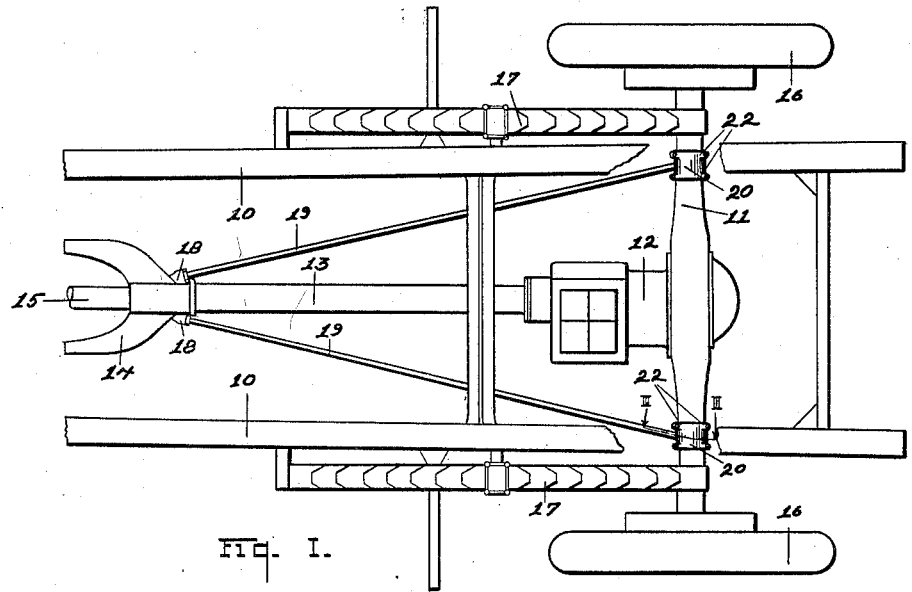
Fig. I.
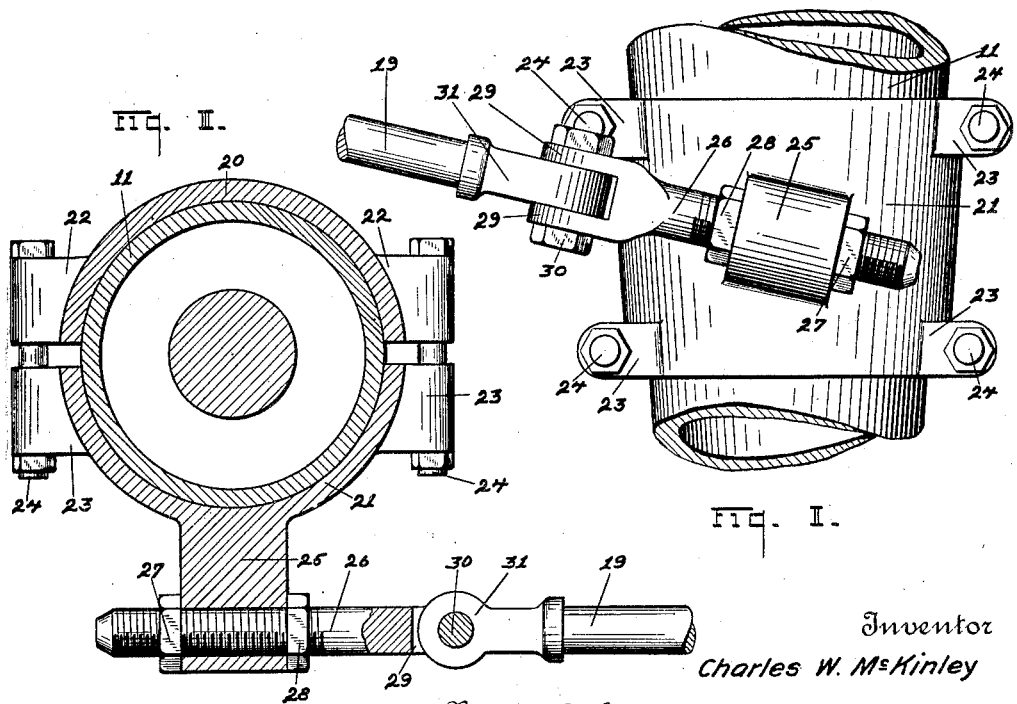
Fig. II.
Fig. I.
Inventor
Charles W. McKinley
By Chester H. Brazelton
Attorney

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

MOTOR-VEHICLE CONSTRUCTION.

1,346,326.  Specification of Letters Patent.  Patented July 13, 1920.

Application filed December 7, 1917. Serial No. 205,972.

*To all whom it may concern:*

Be it known that I, CHARLES W. McKIN-LEY, a citizen of the United States, residing at Toledo, in the county of Lucas and State of Ohio, have invented certain new and useful Improvements in Motor-Vehicle Construction, of which I declare the following to be a full, clear, and exact description.

This invention relates to improvements in motor vehicle construction and more particularly to improvements in the connections between the hound rods and the rear axle of a motor vehicle.

The principal object of my invention is to provide easy releasable and quickly-adjustable connections between the hound rods and the rear axle of a motor vehicle.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which:

Figure I is a top plan view of the rear end of a motor vehicle chassis embodying my invention, parts of the frame being broken away in order to show the hound rod connections more clearly.

Fig. II is an enlarged, fragmentary, bottom plan view of a portion of the axle showing the hound rod connections from beneath.

Fig. III is an enlarged, detail, sectional view, taken substantially on the line III—III of Fig. I.

In the drawings, similar reference numerals refer to similar parts throughout the several views, and the sectional view is taken looking in the direction of the little arrows at the ends of the section line.

Considering the numbered parts of the drawing, I have shown a motor vehicle frame 10, and a rear axle 11 on which the wheels 16 are mounted, said rear axle being connected to the frame by means of the cantaliver springs 17. The transmission casing 12 is attached to the axle 11 and the rear end of the torque tube 13 is connected to said transmission casing. A yoke 14 is connected at the forward end of the torque tube 13, by means of which the torque tube is pivotally connected with the frame. The propeller shaft 15 extends to the transmission mechanism within the torque tube 13. In order to prevent the axle twisting relative to the frame, the hound rods 19 are provided, the forward ends of which are connected in the bosses 18 projecting from the yoke 14. Connections are provided between the axle 11 and the hound rods 19, said connections being located substantially in line with the side members of the frame, and each connection comprising generally a split sleeve encircling the axle and adjustably and pivotally connected with the rear end of one of the hound rods. Each of these connections is identical with the other and therefore but one of them will be described.

A pair of semi-cylindrical sleeves 20 and 21 are provided, the sleeve 20 being provided with projecting ears 22, while the sleeve 21 is provided with the projecting ears 23. These sleeves fit around the axle 11, with the sleeve 21 below the axle, and the two sleeves are secured together by bolts 24 passing through the ears 22 and 23. A boss 25 projects downwardly from the lower side of the sleeve 21, the axis of said boss being inclined to the axle in the general direction of the hound rod, and said boss being provided with an axial opening extending therethrough. A threaded pin 26 extends through said opening and nuts 27 and 28 are threaded on the pin 26, one on each side of the boss 25. The forward end of the pin 26 is forked, having the arms 29 between which the ear 31 extending from the rear end of the hound rod 19 is disposed, the pin 26 and the hound rod 19 being pivotally connected together by means of the bolt 30 extending through the arms 29 and the ear 31.

From the description of the parts given above, the operation of this device should be very readily understood. The sleeves 20 and 21, which are clamped about the axle 11 by means of the bolts 24, become, in effect, part of the axle. The hound rods 19 are connected to the sleeves through the pins 26 which are adjustably connected with the boss 25 of the sleeve 21. By turning the nuts 27 and 28 respectively, the position of the pin 26 with reference to the sleeve 21 may be changed and hence the hound rods may be tightened or slackened. This tensioning adjustment can be very readily and quickly effected. The sleeves 20 and 21 can be disconnected from the axle by releasing the bolts 24 and hence the hound rods can be disconnected from the axle, as may be necessary when the axle is to be removed, without disturbing the adjustment of the hound rods so that they can be connected in place again with the same adjustment as was used before they were disconnected.

This construction, therefore, gives a connection between the hound rods and the axle which is very simple and economical in construction, affords a very convenient tension adjustment for the hound rods, and is of such a nature that it can be very readily disconnected from the axle without disturbing the tension adjustment of the hound rods. The hound rods prevent movement of the sleeves away from each other on the axle 11, while the taper of the axle prevents movement of the sleeves toward each other on the axle.

I am aware that the particular embodiment of my invention, which I have here shown and described, is susceptible of considerable variation without departing from the spirit thereof, and therefore, I desire to claim my invention broadly, as well as specifically, as indicated by the appended claims.

Having thus described my invention, what I claim as new and desire to secure by Letters Patent, is:

1. The combination with a motor vehicle, having a frame, an axle, and hound rods connecting said frame and axle; of a pair of split sleeves embracing said axle, adjacent the ends thereof, each of said sleeves being provided with a downwardly projecting boss; a pin adjustably mounted in each boss; and pivotal connections between said pins and the rear ends of said hound rods.

2. The combination with a motor vehicle, having a frame, an axle, and hound rods connecting said frame and axle; of a pair of split sleeves embracing said axle, adjacent the ends thereof, each of said sleeves being provided with a boss projecting downwardly therefrom; and a pin adjustably mounted in each boss and extending in the direction of the corresponding hound rod, the forward end of said pin being forked, the rear ends of said hound rods extending between the forked ends of said pins and being pivotally connected thereto.

In testimony whereof I affix my signature.

CHARLES W. McKINLEY.